United States Patent
Lee et al.

(10) Patent No.: US 11,514,824 B2
(45) Date of Patent: Nov. 29, 2022

(54) DISPLAY DEVICE

(71) Applicant: Samsung Display Co., LTD., Yongin-si (KR)

(72) Inventors: Jung Hun Lee, Hwaseong-si (KR); Ji Heon Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/399,734

(22) Filed: Aug. 11, 2021

(65) Prior Publication Data

US 2022/0068168 A1 Mar. 3, 2022

(30) Foreign Application Priority Data

Sep. 3, 2020 (KR) .................. 10-2020-0112095

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1624* (2013.01); *G06F 1/1643* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 5,694,861 A * | 12/1997 | Laukamm-Josten | A47B 21/007 108/50.01 |
| 5,699,225 A * | 12/1997 | Yavitz ............. | A47B 21/007 108/50.01 |
| 5,699,744 A * | 12/1997 | Lechman ......... | A47B 21/007 108/107 |
| 5,797,666 A * | 8/1998 | Park ............... | A47B 21/0073 312/223.3 |
| 5,964,164 A * | 10/1999 | Lechman ......... | A47B 21/007 211/208 |
| 7,047,890 B2 * | 5/2006 | Korber ............ | A47B 21/0073 108/50.01 |
| 9,282,814 B2 * | 3/2016 | Riley .............. | A47C 7/723 |
| 2004/0090154 A1 * | 5/2004 | Chang ............. | A47B 21/0073 348/E5.128 |
| 2006/0007368 A1 | 1/2006 | Slikkerveer et al. | |

FOREIGN PATENT DOCUMENTS

| | | |
|---|---|---|
| KR | 10-0946586 | 3/2010 |
| KR | 10-2015-0089994 | 8/2015 |

* cited by examiner

*Primary Examiner* — Lisa Lea-Edmonds
(74) *Attorney, Agent, or Firm* — Kile Park Reed & Houtteman PLLC

(57) ABSTRACT

A display device includes a table including an upper plate portion and a support portion that supports the upper plate portion; a window member disposed in an upper portion of the upper plate portion; and a display module slidable with respect to the window member, wherein a position of the display module varies from a first position of being accommodated in the upper plate portion to overlap the window member to a second position of protruding from the upper portion of the upper plate portion.

20 Claims, 10 Drawing Sheets

DISPLAY DEVICE

CROSS-REFERENCE TO RELATED APPLICATION(S)

This application claims priority to and benefits of Korean Patent Application No. 10-2020-0112095 under 35 U.S.C. § 119 filed on Sep. 3, 2020 in the Korean Intellectual Property Office, the entire contents of which are incorporated herein by reference.

BACKGROUND

1. Technical Field

The disclosure relates to a display device.

2. Description of the Related Art

The importance of display devices is increasing along with the development of multimedia. Accordingly, various types of display devices, such as liquid crystal displays (LCDs) and organic light-emitting diode (OLED) displays, are being used.

Recently, foldable display devices, to which flexible display panels are applied to provide a large screen and improve portability during use, are being developed. Each component of the flexible display panel may be made of a flexible material and thus may be bent.

Flexible displays are foldable or rollable. By using the characteristics of the flexible display, display devices providing various modes of use may be implemented.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device capable of providing various modes of use and allowing deformation of a member to be reduced.

However, aspects of the disclosure are not restricted to the ones set forth herein. The above and other aspects of the disclosure will become more apparent to one of ordinary skill in the art to which the disclosure pertains by referencing the detailed description of the disclosure given below.

An embodiment of a display device may include a table including an upper plate portion and a support portion that supports the upper plate portion; a window member disposed in an upper portion of the upper plate portion; and a display module slidable with respect to the window member, wherein a position of the display module varies from a first position of being accommodated in the upper plate portion to overlap the window member to a second position of protruding from the upper portion of the upper plate portion.

The display module may be flatly unfolded parallel to the window member in the first position.

The display module may be visible through the window member in the first position.

The display module may be perpendicular or inclined with respect to the window member in the second position.

An overlapping area between the window member and the display module in the first position may be greater than an overlapping area between the window member and the display module in the second position.

The display module may form an inclination with the window member and may protrude out of the upper plate portion of the table when the display module slides.

A portion of the display module that overlaps the window member may slide parallel to the window member, and a portion of the display module that does not overlap the window member may slide in a direction crossing the window member.

At least a portion of the display module accommodated in the upper plate portion may slide parallel to the window member, and at least a portion of the display module that protrudes from the upper portion of the upper plate portion may slide in a direction crossing the window member.

The display device may further include a roller extending in a direction crossing a sliding direction of the display module, wherein the display module may be bent such that the sliding direction of the display module may vary based on the roller.

The display device may further include a driver electrically connected to a side of the display module, the driver elevating the side of the display module.

The display device may further include a rail disposed in the upper plate portion; and a guide member which connects the rail to the display module and slides along the rail to guide sliding of the display module.

The display module may include a display panel and a support member that supports the display panel, and the guide member may be directly connected to the support member.

The guide member and the support member may be integral with each other.

The support member may be a metal plate.

The window member may include a glass window; and a touch sensing layer disposed on a lower surface of the glass window, and the display module may include a display panel and a film window disposed on an upper surface of the display panel.

The glass window may be thicker than the film window.

An embodiment of a display device may include a window member including a touch sensing layer; a display module slidable with respect to the window member; a driver electrically connected to a side of the display module, the driver elevating the side of the display module in a direction crossing the window member; a guide member connected to another side of the display module; and a rail connected to the guide member, wherein a position of the display module may vary from a first position of overlapping the window member to a second position of being perpendicular or inclined with respect to the window member.

The display module may be flatly unfolded parallel to the window member in the first position.

The display module may form an inclination with the window member when the display module slides.

The window member, the display module, the driver, the guide member, and the rail may be disposed in a table.

The display device according to an embodiment is capable of providing various modes of use and allowing deformation of a member to be reduced.

The effects of the disclosure are not limited to the aforementioned effects, and various other effects are included in the specification.

BRIEF DESCRIPTION OF THE DRAWINGS

The above and other aspects and features of the disclosure will become more apparent by describing embodiments thereof in detail with reference to the attached drawings, in which.

DETAILED DESCRIPTION OF THE EMBODIMENTS

Figure 1:
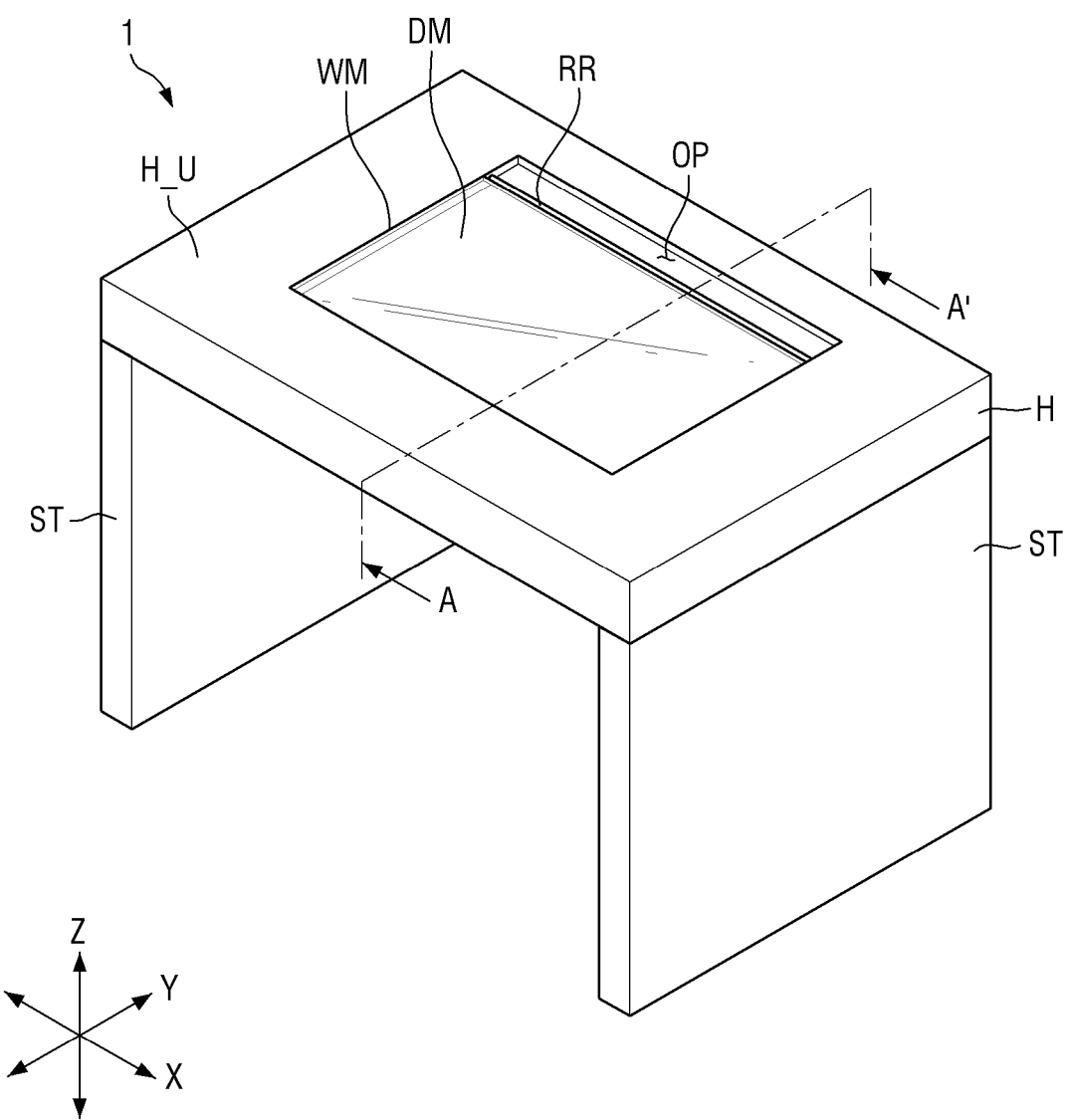
FIG. 1 is a perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described with reference to the accompanying drawings.

Figure 2:
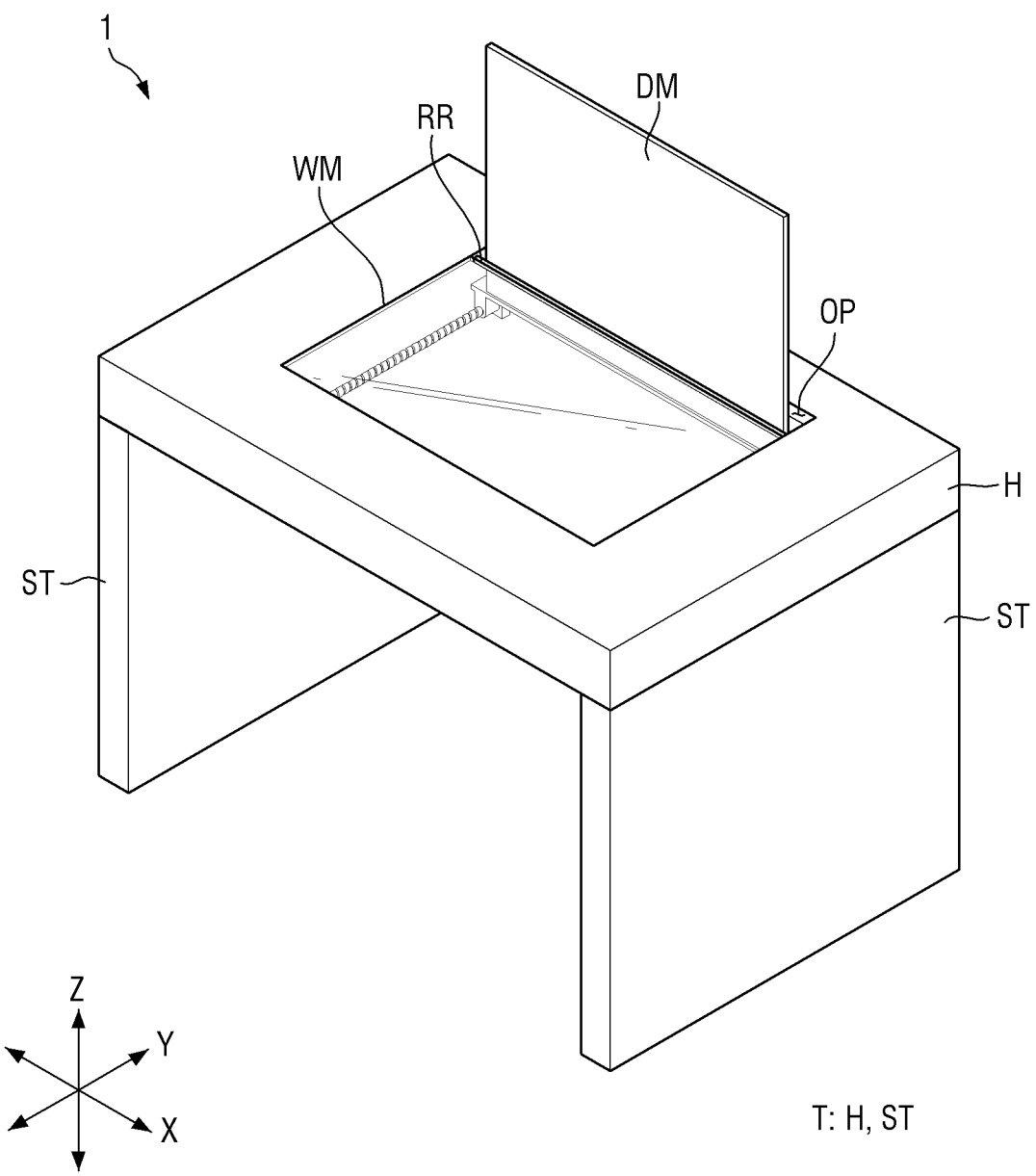
FIG. 2 is a perspective view of the display device in a state in which a display module is withdrawn according to an embodiment.
Figure 3:
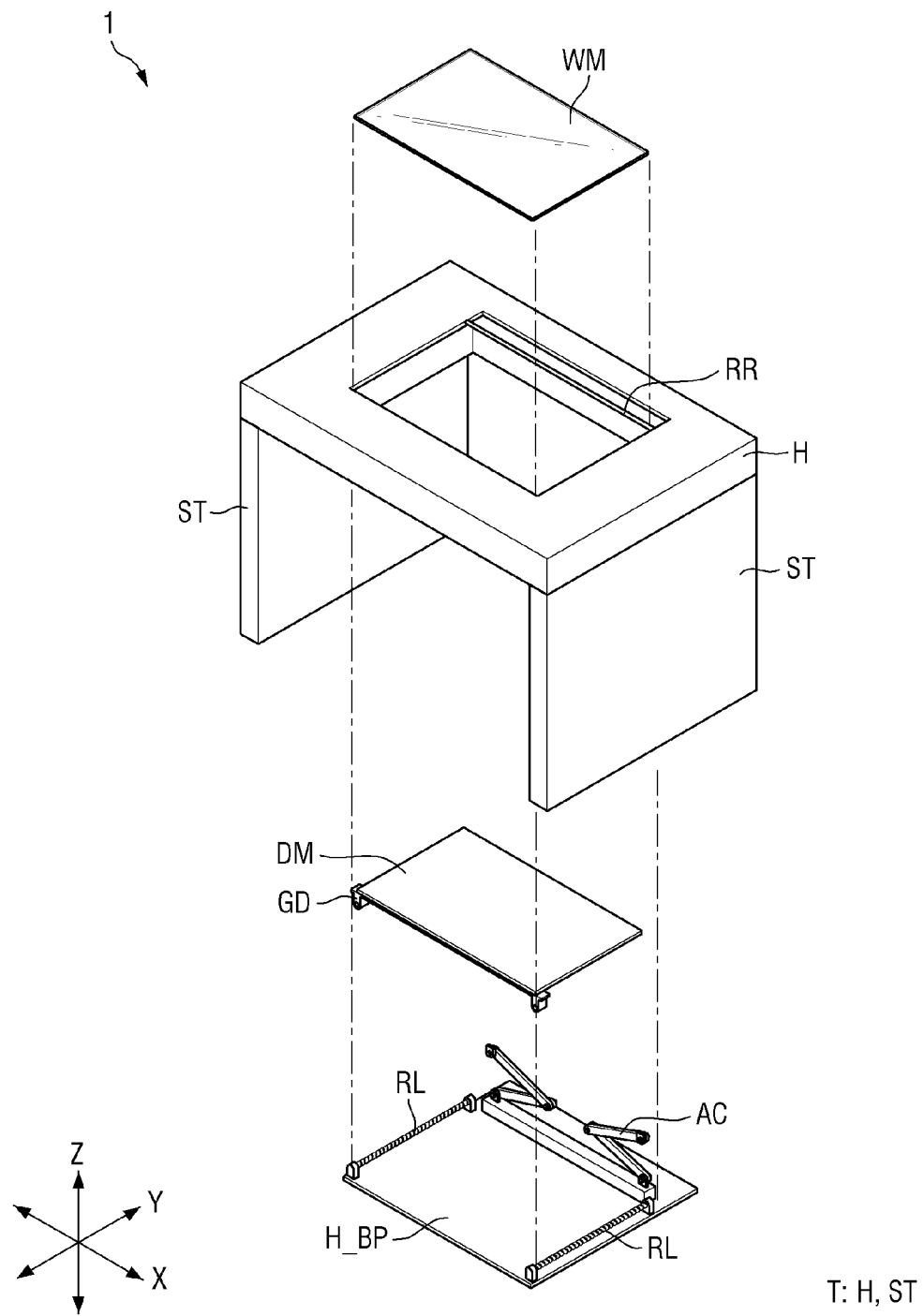
FIG. 3 is an exploded view of the display device according to an embodiment.
Figure 4:
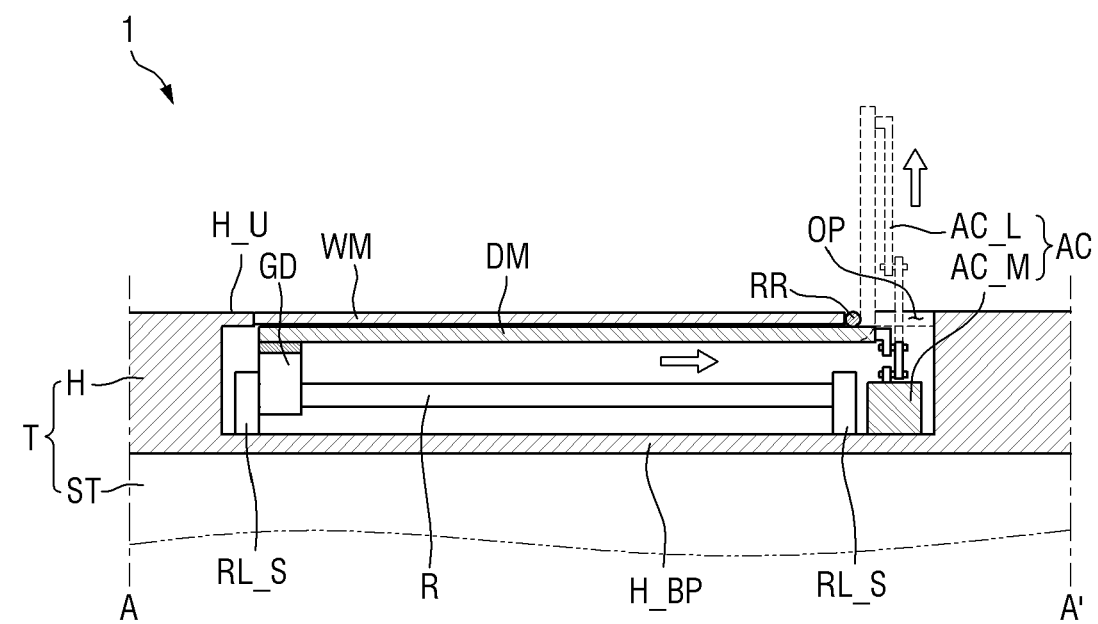
FIG. 4 is a schematic cross-sectional view taken along line A-A' of FIG. 1.

FIG. 1 is a perspective view of a display device according to an embodiment. FIG. 2 is a perspective view of the display device in a state in which a display module is withdrawn according to an embodiment. FIG. 3 is an exploded view of the display device according to an embodiment. FIG. 4 is a schematic cross-sectional view taken along line A-A' of FIG. 1.

Hereinafter, a first direction X, a second direction Y, and a third direction Z are different directions intersecting each other. For example, the first direction X may be a length direction, the second direction Y may be a width direction, and the third direction Z may be a thickness direction. The first direction X, the second direction Y, and the third direction Z may include two or more directions. For example, the third direction Z may include an upward direction toward an upper side in the drawing and a downward direction toward a lower side in the drawing. One or a surface of a member disposed to face in the upward direction may be referred to as an upper surface, and the other or another surface of the member disposed to face in the downward direction may be referred to as a lower surface. However, the directions should be understood as referring to a relative direction and are not limited to the above examples.

A display device 1 according to an embodiment may include various devices displaying a screen or an image. Hereinafter, the display device 1, in which a display module DM may be integral with furniture, for example, a table T, will be illustrated, but the disclosure is not limited thereto. The display device 1 may include, for example, a smartphone, a mobile phone, a tablet personal computer (PC), a personal digital assistant (PDA), a portable multimedia player (PMP), a television, a game machine, a wrist watch-type electronic device, a head-mounted display, a monitor of a PC, a laptop computer, a vehicle navigation device, a vehicle instrument panel, a digital camera, a camcorder, an external billboard, an electric sign board, various medical devices, various inspection devices, various household appliances such as a refrigerator and a washing machine, and a device for the Internet of Things but the disclosure is not limited thereto.

Referring to FIGS. 1 to 4, the display device 1 may include the table T, a window member WM, and the display module DM.

The table T may include an upper plate portion H and a support portion ST for supporting the upper plate portion H.

The upper plate portion H may be disposed at an upper side of the table T. The upper plate portion H may provide a space for mounting the window member WM and the display module DM. The upper plate portion H may mean a housing in which the window member WM and the display module DM may be mounted. For example, as shown in FIGS. 1 to 3, the upper plate portion H may have a substantially flat cuboid shape having an upper surface and/or a lower surface parallel to the first direction X and the second direction Y, but the disclosure is not limited thereto.

As shown in FIG. 4, the upper plate portion H may include an interior space. The display module DM, a driver AC, and a rail RL may be mounted in the interior space.

An upper side of the interior space may be open upward. The window member WM may be disposed to cover or overlap the upper side of the interior space. The window member WM may constitute an upper surface of the interior space.

The window member WM may be disposed in the upper surface of the upper plate portion H and disposed to cover or overlap a portion of the open upper side of the interior space. Accordingly, as shown in FIG. 4, an opening OP, through which the interior space of the upper plate portion H communicates with the outside, may be formed in an upper portion H_U of the upper plate portion H. As will be described below, the display module DM may be retracted and taken out through the opening OP.

A lower side of the interior space may be completely covered or overlapped by a lower plate H_BP. The lower plate H_BP may constitute a lower surface of the interior space of the upper plate portion H. In FIG. 4, the upper plate portion H and the lower plate H_BP are illustrated as separate members, but the lower plate H_BP and the upper plate portion H may be integral with each other as a portion of the upper plate portion H.

The support portion ST supports the upper plate portion H. The support portion ST may support the upper plate portion H such that the upper plate portion H is spaced apart from a support surface in the third direction Z. In an embodiment, a pair of support portions ST for supporting a lower end of the upper plate portion H are illustrated, but the number, shape, and arrangement of the support portions ST are not limited thereto.

In FIGS. 1 to 4, the display device 1 including the table T is illustrated, but the disclosure is not limited thereto. The display device 1 may be installed or disposed in the table T and may refer to the remaining components excluding the table T, for example, the window member WM, the display module DM, the rail RL, the driver AC, and a guide member GD. In another example, the display device 1 may also refer to a table T in which the display module DM may be installed or disposed.

The window member WM may be disposed in the upper portion H_U of the upper plate portion H. An upper surface of the window member WM may be positioned at the same level as the upper surface of the upper plate portion H. The upper surface of the window member WM and the upper surface of the upper plate portion H may form one flat horizontal surface. In other words, the window member WM may constitute a portion of the upper surface of the upper plate portion H. In an embodiment, the window member WM has a substantially rectangular shape in a plan view, but the disclosure is not limited thereto.

The window member WM may be disposed to cover or overlap a portion of the upper side of the interior space in the upper plate portion H, which is open upward. As shown in FIG. 1, the opening OP having a substantially slit shape extending in the first direction X may be formed between the upper plate portion H and the window member WM. The display module DM may be retracted and taken out through the opening OP.

The window member WM may be made of a transparent material. The interior space of the upper plate portion H may be visible through the window member WM. In a case that the display module DM is accommodated in the upper plate portion H, the display module DM may be visible through the window member WM.

The window member WM may receive a touch input. The touch input may be performed using a touch input tool, for example, a user's finger or a touch pen or a stylus.

The display module DM may provide a video or an image. The display module DM may be disposed to be slidable with respect to the window member WM. The display module DM may slide to be retracted into and taken out of the upper plate portion H. The display module DM may be retracted into and taken out of the upper plate portion H through the opening OP formed in the upper surface of the upper plate portion H. The display module DM may be retracted to be accommodated in the upper plate portion H or taken out to protrude from the upper surface of the upper plate portion H.

The display module DM has flexibility to be bendable. The display module DM may be bent to form an inclination with the window member WM and externally taken out of the upper plate portion H. As shown in FIG. 4, a portion of the display module DM overlapping the window member WM slides in a direction parallel to the window member WM, and a sliding direction thereof may be changed based on a roller RR to be described below. A portion of the display module DM passing the roller RR or a portion of the display module DM not overlapping the window member WM may slide in a direction crossing or intersecting the window member WM. Accordingly, at least a portion of the display module DM accommodated in the upper plate portion H may slide to be parallel with the window member WM, and at least a portion of the display module DM protruding from the upper plate portion H may slide in the direction crossing or intersecting the window member WM. For example, the display module DM may move in an approximately horizontal direction inside the upper plate portion H, and the display module DM may move in an approximately vertical direction outside the upper plate portion H.

The position of the display module DM may be changed or varied due to the sliding movement of the display module DM. Accordingly, the display device 1 can provide various states of use. The state of use may mean a mode.

The state or use may include a first state or first position in which the display module DM may be accommodated in the upper plate portion H and a second state or second position in which the display module DM may be externally taken out of the upper plate portion H.

As shown in FIG. 1, in the first state or first position, the display module DM may be accommodated in the upper plate portion H to overlap the window member WM. In the first state or first position, the window member WM and the display module DM may be disposed so as to overlap each other in a plan view. An overlapping area between the window member WM and the display module DM in the first state or first position may be greater than an overlapping area between the window member WM and the display module DM in the second state or second position. The first state or first position may mean a state or a position in which the overlapping area between the window member WM and the display module DM is maximized.

In the first state or first position, the display module DM may be flatly unfolded so as to be disposed parallel with the window member WM which may be horizontally and flatly deployed. For example, as shown in FIG. 4, in the first state or first position, the display module DM may overlap the window member WM below the window member WM, and the display module DM may be in a state in which the display module DM is not rolled or folded and may be flatly unfolded to be parallel to the window member WM. Accordingly, it is possible to minimize the deformation of the display module DM, which may occur in a case that the display module DM is rolled or folded for a long time.

In the first state or first position, the window member WM may operate to receive a touch input. Although not shown, operations of the window member WM and the display module DM may be controlled by a separate control device, such as a computer, or a controller. Accordingly, a user may perform a touch input corresponding to a video or image, which is provided to the display module DM, on the window member WM. For example, in the first state or first position, a touch use mode capable of performing a touch input based on a video or image displayed on the display module DM may be provided.

As shown in FIG. 2, in the second state or second position, the display module DM may be taken out of the upper plate portion H and may be disposed to protrude upward from the upper surface of the upper plate portion H. In the second state or second position, the display module DM may be disposed in the direction crossing or intersecting the window member WM. For example, the display module DM may be disposed to be perpendicular or inclined with respect to the window member WM. For example, the display module DM may be disposed to form an angle in a range of about 90° to about 120° with the window member WM.

In the second state or second position, most of the display module DM may be taken out of the upper plate portion H. In the second state or second position, an area of a portion of the display module DM externally taken out of the upper plate portion H may be greater than an area of a portion thereof accommodated in the upper plate portion H. The second state or second position may mean a state in which a portion of the display module DM, for example, only a lower end portion thereof, is accommodated in the upper plate portion H. In the second state or second position, the display module DM may also be completely taken out of the upper plate portion H.

In the second state or second position, the window member WM may operate to not receive a touch input. The window member WM may operate to receive a touch input in both the first state or first position and the second state or second position.

As described above, in the second state or second position, since the display module DM is disposed to protrude from the upper surface of the upper plate portion H and is disposed to be perpendicular or inclined with respect to the upper surface of the upper plate portion H and/or the window member WM, it is possible to provide an appropriate viewing angle for viewing a video or image displayed on the display module DM to the user. For example, in the second state or second position, an information viewing mode suitable for viewing a video or image displayed on the display module DM may be provided.

Referring again to FIGS. 1 to 4, the display device 1 may further include the driver AC, the roller RR, the rail RL, and the guide member GD.

The driver AC may move the display module DM in at least one direction. By way of example, the driver AC may be electrically connected to one or a side of the display module DM to elevate the one or a side of the display module DM in the third direction Z. The one side of the display module DM may be a portion which is elevated to be in the second state or second position. The third direction Z may be a vertical direction, but the disclosure is not limited thereto. The third direction Z may include a direction inclined to the vertical direction, for example, a diagonal direction.

As shown in FIG. 4, the driver AC may include an elastic member AC_L and a motor AC_M.

One or a side of the elastic member AC_L may be connected to one or a side of a display panel, and the other or another side thereof may be connected to the motor AC_M. The elastic member AC_L may expand and contract in the third direction Z such that one or a side of the display panel may be elevated. In FIG. 4, a plurality of substantially rod-shaped frames hinge-coupled or hinge-connected to each other are illustrated as the elastic member AC_L, but the disclosure is not limited thereto. The elastic member AC_L may be implemented in various ways such as a cylinder or a mechanical arm.

The roller RR may extend in the first direction X and may be positioned at a point at which the display module DM is bent. The first direction X may be a direction crossing or intersecting the sliding direction of the display module DM. The display module DM may be bent such that the sliding direction of the display module DM may be changed based on the roller RR. As shown in FIG. 4, the roller RR may be disposed in the opening OP formed between the window member WM and the upper plate portion H. The roller RR may be disposed adjacent to a bending point of the display module DM and adjacent to an edge of the window member WM extending in the first direction X. The roller RR may be disposed parallel with the window member WM in a horizontal direction so as to not overlap the window member WM in the third direction Z, but the disclosure is not limited thereto. The roller RR may also be disposed so as to overlap the window member WM in the third direction Z. The roller RR may reduce the stress caused by sliding and bending of the display module DM. In a case that the display module DM is bent, the roller RR may be disposed between the display module DM and the window member WM to prevent the display module DM and the window member WM from coming into direct contact with each other.

The rail RL may be disposed in the upper plate portion H. In FIG. 3, two rails RL having a substantially rod shape are illustrated, but the shape and number of the rails RL are not limited thereto. The rail RL may extend in the second direction Y. The second direction Y may be the sliding direction of the display module DM. The rail RL may be disposed so as to overlap the window member WM in the thickness direction and not overlap the display panel in the thickness direction. In order for the rail RL to not be visible from the outside, the rail RL may also be disposed so as to overlap the upper surface of the upper plate portion H, on which the window member WM may not be disposed, in the thickness direction. The rail RL may be connected to the display panel through the guide member GD to guide a sliding path of the display panel.

The guide member GD may be formed as a substantially rod-shaped frame extending in the first direction X. The guide member GD may be disposed at the other or another side of the display panel to connect the display panel and the rail RL. The other or another side of the display panel may be opposite to one or a side of the display panel, which may be elevated by the driver AC. The other or another side of the display panel may be a portion of the display panel, which may not enter or exit through the opening OP. By way of example, as shown in FIG. 3, the guide member GD may be disposed at the other side of the display panel and disposed along an edge extending in the first direction X.

Figure 5:
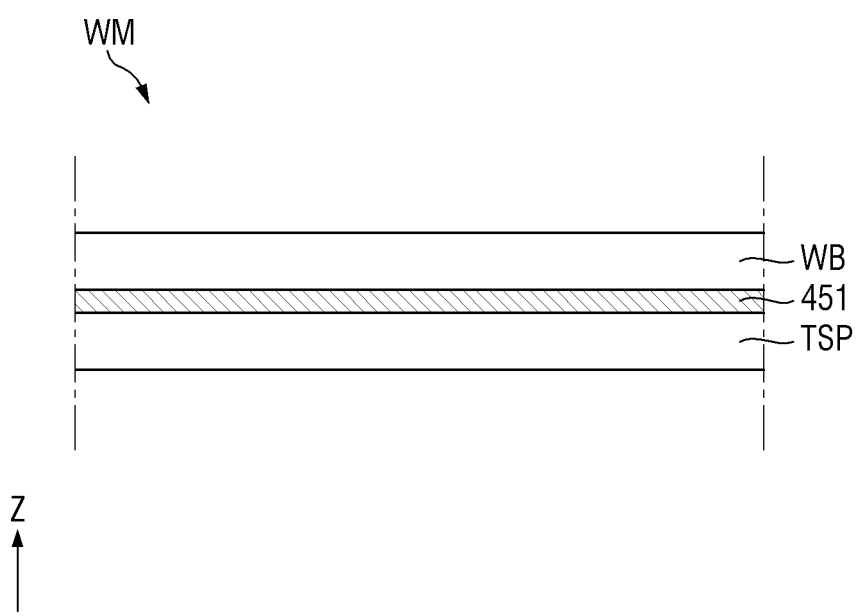
FIG. 5 is a schematic cross-sectional view of a window member of the display device according to an embodiment.

FIG. 5 is a schematic cross-sectional view of the window member of the display device according to an embodiment.

Referring to FIG. 5, the window member WM may include a glass window WB and a touch sensing layer TSP. The window member WM may further include a touch sensing layer coupling or connecting member 451 interposed between the glass window WB and the touch sensing layer TSP.

The glass window WB may be disposed on an upper surface of the touch sensing layer TSP. An upper surface of the glass window WB may be disposed parallel with the upper surface of the upper plate portion H to form an exterior of the upper plate portion H. A lower surface of the glass window WB may be disposed to face the interior space of the upper plate portion H. The glass window WB may be made of a transparent material. The glass window WB may be made of, for example, glass or plastic. The glass window WB may include soda lime glass, alkali aluminosilicate glass, borosilicate glass, or lithium alumina silicate glass. The glass window WB may include chemically strengthened or thermally strengthened glass to have a strong strength. Chemical strengthening may be performed through an ion exchange treatment process in an alkali salt. The ion exchange treatment process may be performed two or more times. The glass window WB may be made of strengthened glass with a thickness of about 100 μm or more in order to secure rigidity against pressure applied on the upper surface thereof, but the disclosure is not limited thereto.

The touch sensing layer TSP may be disposed on the lower surface of the glass window WB. For example, the touch sensing layer TSP may be attached onto the lower surface of the glass window WB in the form of a thin film having a thickness of about 100 μm. The touch sensing layer TSP may be optically transparent. The touch sensing layer TSP may detect a touch input that is input to the upper surface of the window member WM. The touch sensing layer TSP may include a capacitive touch sensor or a pressure-sensitive touch sensor. Although not shown, the touch sensing layer TSP may include a plurality of sensing electrodes that convert a touch input into an electrical signal.

The touch sensing layer coupling member 451 may be interposed between the glass window WB and the touch sensing layer TSP to couple or connect the glass window WB and the touch sensing layer TSP. The touch sensing layer TSP may be attached to the lower surface of the glass window WB through the touch sensing layer coupling member 451. The touch sensing layer coupling member 451 may be optically transparent. For example, the touch sensing layer coupling member 451 may be made of a pressure-sensitive adhesive having a thickness of about 25 μm. As another example, the touch sensing layer coupling member 451 may be made of an optically transparent adhesive or an optically transparent resin.

Figure 6:
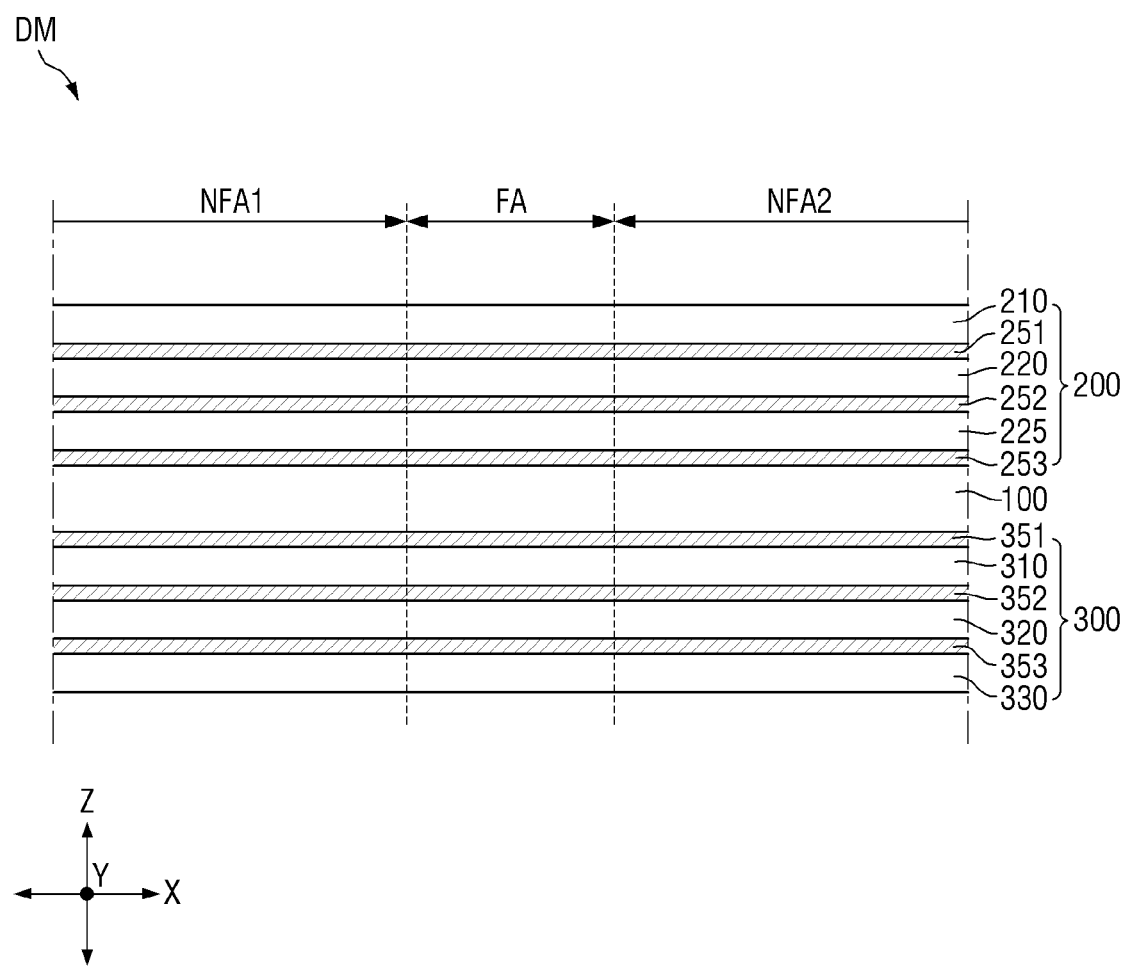
FIG. 6 is a schematic cross-sectional view of the display module of the display device according to an embodiment.
Figure 7:
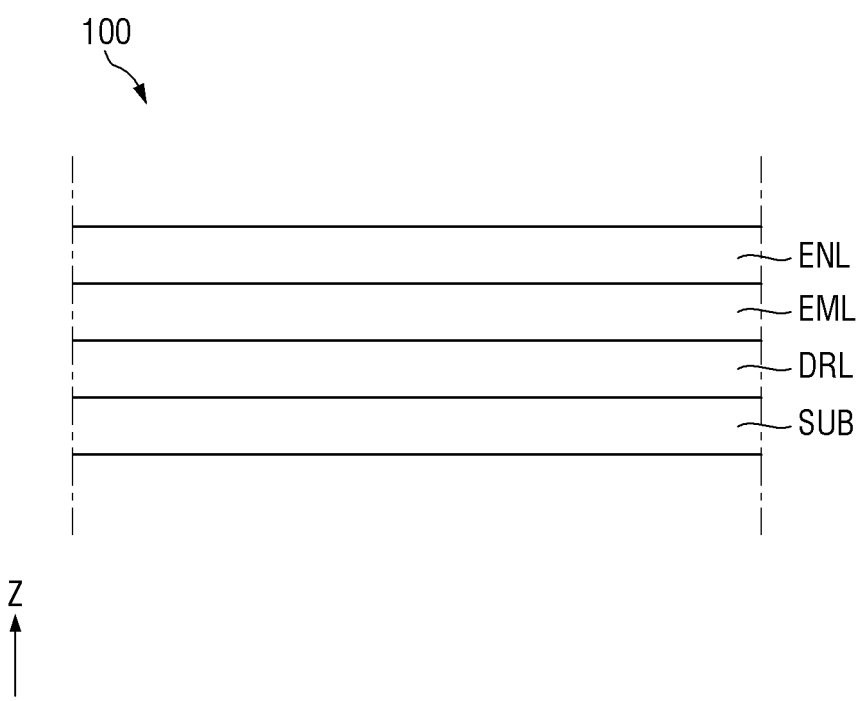
FIG. 7 is a schematic cross-sectional view of a display panel of FIG. 6.

FIG. 6 is a schematic cross-sectional view of the display module of the display device according to an embodiment. FIG. 7 is a schematic cross-sectional view of the display panel of FIG. 6.

Referring to FIGS. 6 and 7, the display module DM may include a display panel 100, an upper stack structure 200 disposed on an upper surface of the display panel 100, and a lower stack structure 300 disposed on a lower surface of the display panel 100. The upper surface of the display panel 100 may be a surface on which a screen is displayed, and the lower surface of the display panel 100 may be a surface opposite to the upper surface. FIG. 6 illustrates a first non-folding area NFA1 and a second non-folding area NFA2 with a folding area FA disposed between the first non-folding area NFA1 and the second non-folding area NFA2.

The display panel 100 is a panel on which a screen or an image is displayed. Examples of the display panel 100 include self-luminous display panels such as an organic light-emitting diode (OLED) display panel, an inorganic electro-luminescence (EL) display panel, a quantum dot light-emitting display (QED) panel, a micro light-emitting display (micro LED) panel, a nano LED panel, a plasma display panel (PDP), a field emission display (FED) panel, and a cathode ray tube (CRT) display panel as well as light-receiving display panels such as a liquid crystal display (LCD) panel and an electrophoretic display (EPD) panel. Hereinafter, the OLED display panel will be described as an example of the display panel 100, and unless a further distinction is required, the OLED display panel applied to an embodiment will be simply referred to as the display panel 100. However, embodiments are not limited to the OLED display panel, and other display panels listed above may be applied within the scope of the disclosure.

Referring to FIG. 7, the display panel 100 may include a substrate SUB, a circuit driving layer DRL disposed on the substrate SUB, a light-emitting layer EML disposed on the circuit driving layer DRL, and an encapsulation layer ENL disposed on the light-emitting layer EML.

The substrate SUB may be a flexible substrate including a flexible polymer material such as polyimide. Accordingly, the display panel 100 may be bendable, foldable, or rollable. In an embodiment, the substrate SUB may include a plurality of sub-substrates which may overlap each other in the thickness direction with a barrier layer interposed therebetween. Each sub-substrate may be a flexible substrate.

The circuit driving layer DRL may be disposed on the substrate SUB. The circuit driving layer DRL may include a circuit for driving the light-emitting layer EML of a pixel. The circuit driving layer DRL may include a plurality of thin film transistors.

The light-emitting layer EML may be disposed on the circuit driving layer DRL. The light-emitting layer EML may include an organic light-emitting layer. The light-emitting layer EML may emit light with various levels of luminance according to a driving signal transmitted from the circuit driving layer DRL.

The encapsulation layer ENL may be disposed on the light-emitting layer EML. The encapsulation layer ENL may include an inorganic film or a stacked film of an inorganic film and an organic film.

Referring again to FIG. 6, the upper stack structure 200 may be disposed on the upper surface of the display panel 100. The upper stack structure 200 may include a polarization member 225 and a film window 220 which may be sequentially stacked upward from the display panel 100. The upper stack structure 200 may further include a film window protection layer 210 disposed on an upper surface of the film window 220.

The polarization member 225 may be disposed on the upper surface of the display panel 100. The polarization member 225 polarizes light passing therethrough. The polarization member 225 may serve to reduce the reflection of external light. The polarization member 225 may be implemented as a member, for example, a color filter made of a material that selectively transmits or absorbs light in a specific or predetermined wavelength band. The color filter may include a plurality of color filters filtering light in different wavelength bands. Since the color filter absorbs external light to a significant level, the reflection of the external light can be reduced, and the display module DM can be implemented to be thinner as compared to a case where a polarization film is applied. As another example, the polarization member 225 may be implemented as a polarization film that polarizes light.

The film window 220 may be disposed on an upper surface of the polarization member 225. The film window 220 serves to protect the display panel 100. The film window 220 may be made of a transparent material. The film window 220 may be made of, for example, glass or plastic. The film window 220 may be thinner than the glass window WB. In an embodiment, the film window 220 may have a thickness in a range of about 30 µm to about 100 µm, but the disclosure is not limited thereto.

In a case that the film window 220 may include plastic, it may be more advantageous in exhibiting flexible characteristics such as folding. Examples of plastic applicable to the film window 220 may include polyimide (PI), polyacrylate, polymethylmethacrylate (PMMA), polycarbonate (PC), polyethylene naphthalate (PEN), polyvinylidene chloride, polyvinylidene difluoride (PVDF), polystyrene, an ethylene vinyl alcohol copolymer, polyethersulphone (PES), polyetherimide (PEI), polyphenylene sulfide (PPS), polyallylate, tri-acetyl cellulose (TAC), cellulose acetate propionate (CAP), and the like, but the disclosure is not limited thereto. The plastic film window 220 may be made of at least one selected from among the plastic materials listed above.

In a case that the film window 220 may include glass, the glass may be ultra-thin glass (UTG) or thin film glass. In a case that an ultra-thin film or a thin film is made of glass, the ultra-thin film or thin film may have flexible characteristics of being bendable, foldable, or rollable. The glass of the film window 220 may include soda lime glass, alkali aluminosilicate glass, borosilicate glass, or lithium alumina silicate glass.

The glass of the film window 220 may include chemically strengthened or thermally strengthened glass to have a strong strength. Chemical strengthening may be performed through an ion exchange treatment process in an alkali salt. The ion exchange treatment process may be performed two or more times.

The film window protection layer 210 may be disposed on the upper surface of the film window 220. The film window protection layer 210 may perform at least one function among functions of preventing scattering of the film window 220, absorbing an impact, preventing fingerprints, and preventing glare. The film window protection layer 210 may include a transparent polymer film. The transparent polymer film may include at least one selected from among polyethylene terephthalate (PET), PEN, PES, PI, polyarylate (PAR), polycarbonate (PC), PMMA, and a cycloolefin copolymer (COC) resin.

The upper stack structure 200 may include upper coupling or connecting members 251, 252, and 253 which couple or connect adjacent stacked members. For example, a first coupling member 251 may be disposed between the film window 220 and the film window protection layer 210 to couple or connect the film window 220 and the film window protection layer 210. A second coupling member 252 may be disposed between the film window 220 and the polarization member 225 to couple or connect the film window 220 and the polarization member 225. A third coupling member 253 may be disposed between the polarization member 225 and the display panel 100 to couple or connect the polarization member 225 and the display panel 100. For example, the upper coupling members 251, 252, 253 may be members which attach layers onto one or a surface of the display panel 100. The first coupling member 251 may be a protection layer coupling member through which the film window protection layer 210 may be attached. The second coupling member 252 may be a window coupling member through which the film window 220 may be attached. The third coupling member 253 may be a polarization member coupling member through which the polarization member 225 may be attached. All of the upper coupling members 251, 252, and 253 may be optically transparent. For example, the upper coupling members 251, 252, and 253 may be made of a pressure-sensitive adhesive having a thickness in a range of about 5 μm to about 50 μm.

The lower stack structure 300 may be disposed on the lower surface of the display panel 100. The lower stack structure 300 may include a polymer film layer 310, a functional layer 320, and a support member 330 which may be sequentially stacked downward from the display panel 100.

The polymer film layer 310 may be disposed on the lower surface of the display panel 100. The polymer film layer 310 may include a polymer film. The polymer film may have a thickness in a range of, for example, about 25 μm to about 75 μm. The polymer film layer 310 may include PI, PET, PC, PE, polypropylene (PP), PSF, PMMA, TAC, a cycloolefin polymer (COP), or the like within the spirit and the scope of the disclosure.

The functional layer 320 may be disposed on a lower surface of the polymer film layer 310. The functional layer 320 may be a layer which performs an impact absorbing function, a heat dissipating function, an electromagnetic wave shielding function, a grounding function, a buffering function, a strength reinforcing function, a supporting function, a light blocking function, and/or a digitizing function. The functional layer may be a sheet layer formed of a sheet, a film layer formed of a film, a thin film layer, a coating layer, a panel, or a plate. For example, the functional layer 320 may be formed of a film-type member having a thickness in a range of about 50 μm to about 150 μm. One or a functional layer may be formed as a single layer but may also be formed of a plurality of stacked thin films or coating layers.

The support member 330 may be disposed on a lower surface of the functional layer 320. The support member 330 may perform a function of supporting the display panel 100. The support member 330 may be, for example, a metal plate. Referring further to FIGS. 3 and 4, the support member 330 may be connected to the guide member GD or may be directly connected to the guide member GD. The support member 330 and the guide member GD may be integral with each other. The guide member GD may be made of the same or similar material, for example, a metal, as the support member 330.

The lower stack structure 300 may include lower coupling or connecting members 351, 352, and 353 which couple or connect adjacent stacked members. For example, a fourth coupling member 351 may be disposed between the display panel 100 and the polymer film layer 310 to couple or connect the display panel 100 and the polymer film layer 310. A fifth coupling member 352 may be disposed between the polymer film layer 310 and the functional layer 320 to couple or connect the polymer film layer 310 and the functional layer 320. A sixth coupling member 353 may be disposed between the functional layer 320 and the support member 330 to couple or connect the functional layer 320 and the support member 330. The lower coupling members 351, 352, and 353 may be optically transparent. For example, the lower coupling members 351, 352, and 353 may be made of a pressure-sensitive adhesive having a thickness in a range of about 5 μm to about 50 μm.

Figure 8:
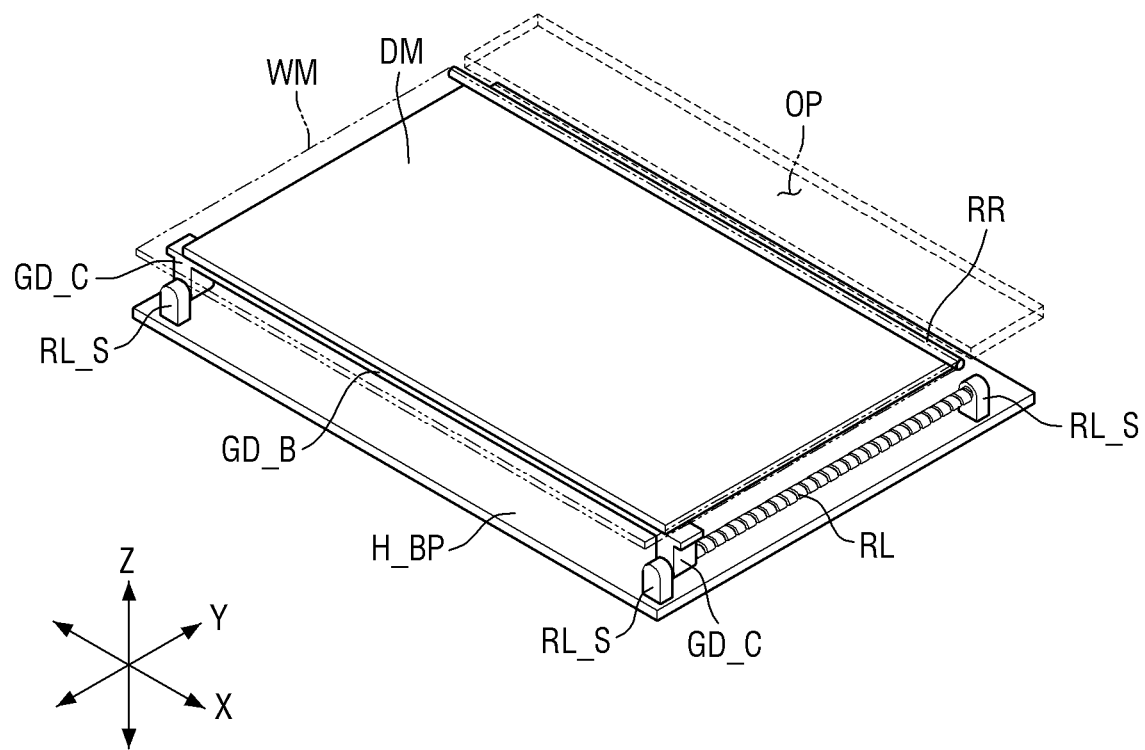
FIGS. 8 to 10 are perspective views illustrating a sliding operation of the display module.
Figure 9:
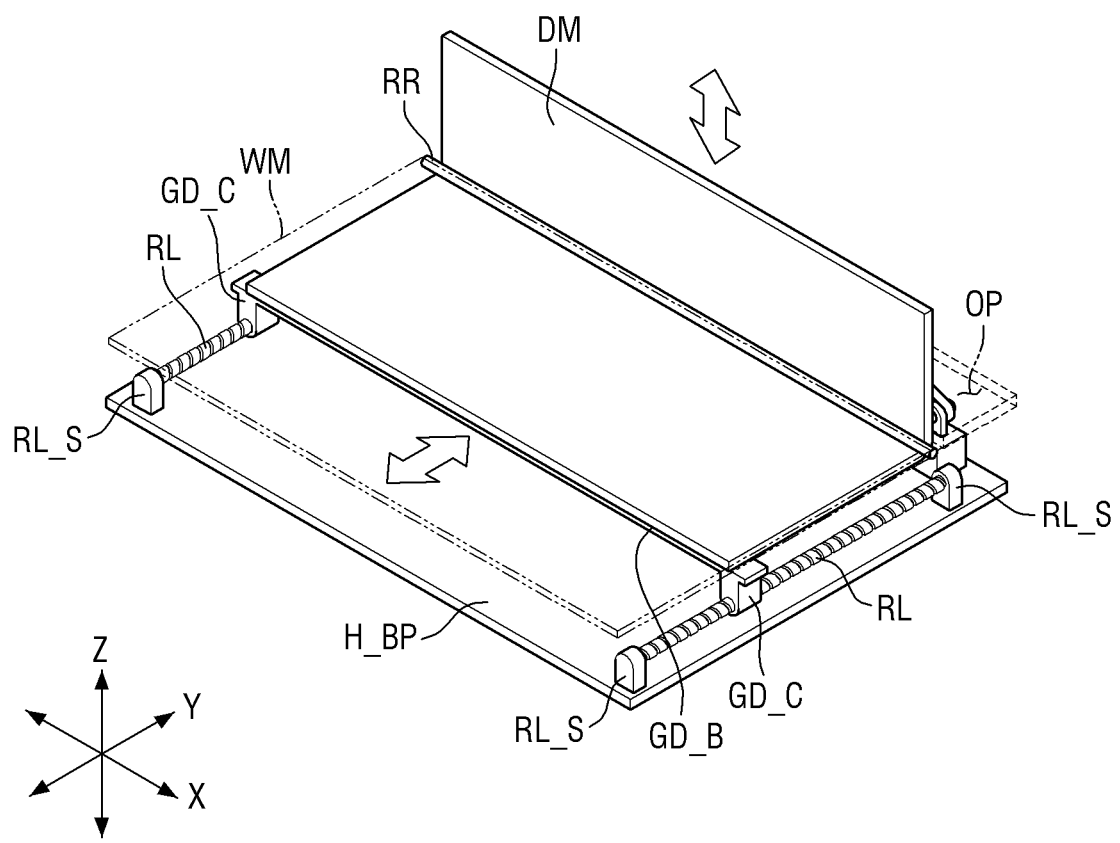
Figure 10:
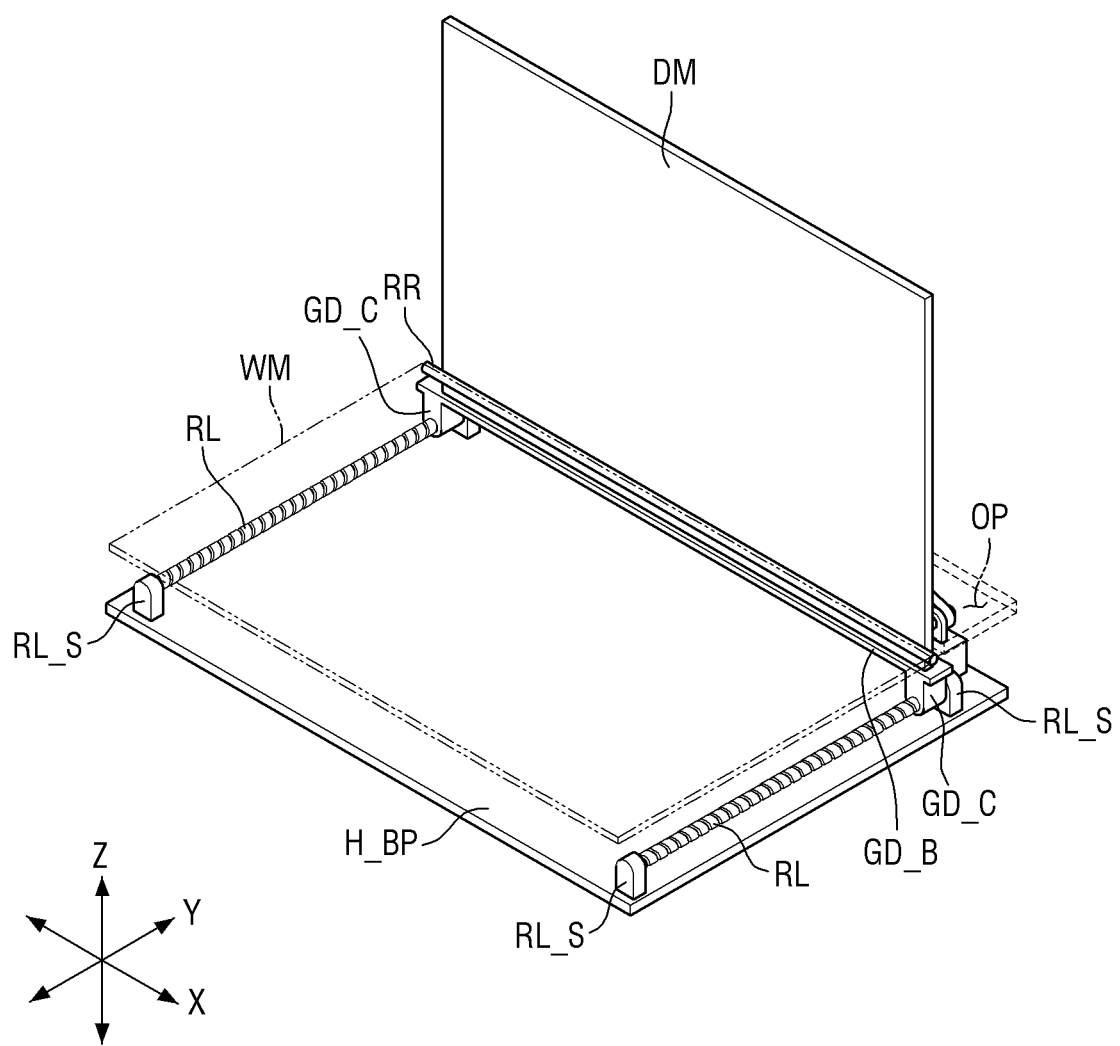

FIGS. 8 to 10 are perspective views illustrating a sliding operation of the display module.

In FIGS. 8 to 10, only the lower plate H_BP of the table T is illustrated for convenience of description, and the illustration of the driver AC and the remaining components of the table T is omitted. As described above, the lower plate H_BP is illustrated as a member detachable from the upper plate portion H, but the disclosure is not limited thereto. The lower plate H_BP may be a portion of the upper plate portion H, which constitutes the lower surface of the interior space of the upper plate portion H, in which the display module DM is accommodated.

Referring to FIGS. 8 to 10, as described above, two substantially rod-shaped rails RL may be disposed with the display module DM interposed therebetween. The two rails RL may be disposed with the display module DM interposed therebetween along both sides of the display module DM extending in the second direction Y. The two rails RL may each be disposed so as to be spaced apart from an upper surface of the lower plate H_BP for movement of the guide member GD.

Both ends of each rail RL may be coupled or connected and fixed to the lower plate H_BP at a certain or given height through a plurality of rail support portions RL_S protruding upward from the upper surface of the lower plate H_BP. In an embodiment, a screw groove may be formed in each of the rail RL and a rail coupling or connecting portion GD_C of the guide member GD, and the rail support portion RL_S may be mounted with a drive motor that rotates the rail RL such that the guide member GD is linearly moved in the second direction Y.

In a case that the display module DM slides, the guide member GD may slide in an extending direction of the two rails RL to guide the sliding movement of the display module DM.

The guide member GD may include a substantially rod-shaped guide bar GD_B extending in the first direction X and the rail coupling portion GD_C disposed at an end portion of the guide bar GD_B and protruding downward.

The guide bar GD_B may be a substantially rod-shaped frame extending in the first direction X. The guide bar GD_B may be connected to the other side of the display module DM. The other side of the display module DM may be opposite to one or a side of the display module DM, which may be elevated by the driver AC. The other side of the display module DM may be a portion of the display module DM, which may not enter or exit through the opening OP. By way of example, as shown in FIG. 3, the guide member GD may be disposed at the other side of the display module DM and may be connected parallel with an edge extending in the first direction X.

Two rail coupling portions GD_C may be disposed at both ends of the guide bar GD_B and may connect the both ends of the guide bar GD_B to the two rails RL so as to be slidable. For example, as shown in FIGS. 8 to 10, the two rails RL may be inserted into the two rail coupling portions GD_C.

Referring to FIG. 8, the window member WM may be disposed parallel to the first direction X and the second direction Y. In the first state or first position, the display module DM may be disposed on the lower surface of the window member WM and flatly unfolded so as to be parallel to the window member WM. An overlapping area between the window member WM and the display module DM may be maximized. By way of example, the overlapping area between the display panel 100 and the touch sensing layer TSP may be maximized in the first state or first position.

In the first state or first position, the guide member GD may be disposed so as to not overlap the opening OP in the third direction Z. For example, the guide member GD may be disposed on the lower surface of the window member WM. The guide member GD may be disposed to be spaced apart from the opening OP by a maximum distance. The maximum distance may be substantially the same as a length of the rail RL in the second direction Y.

Referring further to FIGS. 5 to 7, in the first state or first position, since the display module DM and the window member WM may be disposed so as to be sequentially stacked, the display panel 100 of the display module DM and the touch sensing layer TSP of the window member WM may also be disposed so as to be sequentially stacked upward. For example, in the first state or first position, the touch sensing layer TSP capable of detecting a touch input may be disposed so as to overlap the display panel 100 on which a video or image is displayed, thereby providing a touch use mode capable of performing a touch input on the window member WM so as to correspond to the video or image provided from the display module DM.

Referring to FIG. 9, the display module DM may be bent, for example, in an "L" shape based on the roller RR disposed adjacent to the opening OP so that a portion of the display module DM may be taken out through the opening OP.

As shown in FIG. 4, one or a side of the display module DM disposed adjacent to the opening OP may be lifted upward by the driver AC and taken out through the opening OP. As the one side of the display module DM is elevated upward, the other side of the display module DM may slide to be parallel with the window member WM toward the opening OP.

In other words, a portion of the display module DM, which may be disposed on the lower surface of the window member WM so as to overlap to be parallel with the window member WM, may slide to be parallel with the window member WM toward the opening OP, and the other portion of the display module DM, which may not overlap the member WM and is bent by the roller RR, may slide upward so as to protrude upward from the upper surface of the window member WM.

In a case that the display module DM slides, an overlapping area between the window member WM and the display module DM in the third direction Z may be changed or varied. In a case that the display module DM is taken out, an overlapping area between the window member WM and the display module DM may be gradually decreased. In a case that the display module DM is retracted, an overlapping area between the window member WM and the display module DM may be gradually increased.

In a case that the display module DM slides, the sliding direction of the display module DM may be changed based on the roller RR. A portion of the display module DM, which may be disposed below the window member WM based on the roller RR, may slide in the second direction Y, and the other portion of the display module DM, which is taken out through the opening OP, may slide in the third direction Z. The second direction Y may be a direction parallel to the upper and/or lower surfaces of the window member WM. The second direction Y may be a horizontal direction. The third direction Z may be a vertical direction.

In a case that the display module DM slides, the guide member GD connected to the display module DM may also slide in the second direction Y. The guide member GD may not overlap the opening OP and may be positioned on the lower surface of the window member WM. By way of example, the two rail coupling portions GD_C positioned at both ends of the guide member GD and the guide bar GD_B connected thereto may slide along the two rails RL in the second direction Y. The second direction Y may include a direction toward the opening OP, for example, a right upward direction of FIG. 9 and a direction away from the opening OP, and for example, a left downward direction of FIG. 9. In a case that the display module DM is taken out, the guide member GD may move in a direction toward the opening OP, and in a case that the display module DM is retracted, the guide member GD may move in a direction away from the opening OP. In a case that the display module DM is taken out, the guide member GD may be moved by the tension of the display module DM pulled by the driver AC of FIG. 4 and/or the drive motor mounted in the rail support portion RL_S. In a case that the display module DM is retracted, the guide member GD may be moved in a direction away from the opening OP by the drive motor mounted in the rail support portion RL_S.

Referring to FIG. 10, in the second state or second position, the display module DM may be disposed in a direction crossing or intersecting the window member WM. In the second state or second position, the display module DM may be completely flatly unfolded and elevated in the third direction Z.

In the second state or second position, an overlapping area between the display module DM and the window member WM overlap may be minimized. In the second state or second position, the display module DM and the window member WM may not overlap each other in the third direction. By way of example, in the second state or second position, the overlapping area between the display panel 100 and the touch sensing layer TSP may be minimized, or the display panel 100 and the touch sensing layer TSP may not overlap each other.

In the second state or second position, the guide member GD may be positioned or disposed adjacent to the opening OP. In the second state or second position, the guide member GD may be disposed so as to overlap the opening OP in the third direction Z.

Referring further to FIGS. 5 to 7, in the second state or second position, since the display module DM and the window member WM may be disposed in a direction in which the display module DM and the window member WM cross or intersect each other, the display panel 100 of the display module DM and the touch sensing layer TSP of the window member WM may also be disposed in a direction in which the display panel 100 and the touch sensing layer TSP cross or intersect each other. Since the touch sensing layer TSP may be separated from the display module DM, the display module DM may become thinner, and the display panel 100 that performs a function of displaying information such as a video or an image and the touch sensing layer TSP that performs a function of receiving a user input may be appropriately arranged according to a use environment.

As described above, in the second state or second position, since the display module DM is disposed to be elevated in the third direction Z, it is possible to provide an appropriate viewing angle for viewing a video or image for a long time. For example, in the second state or second position, it is possible to provide an information viewing mode suitable for viewing a movie or broadcast in which a touch input is not required.

In the display device 1 according to an embodiment, the touch sensing layer TSP may be separated from the display module DM and separately provided in the window member WM, thereby implementing the thin display module DM. In the display device 1, a stack structure of the display module DM may be simplified, and the display module DM may be accommodated in an unfolded state, thereby minimizing deformation of the display module DM due to bending or rolling thereof.

A display device according to various embodiments can provide various modes of use, and the deformation of a member therein can be reduced.

Effects of the disclosure are not limited to the above-described description and more diverse effects are included in this specification.

In concluding the detailed description, those skilled in the art will appreciate that many variations and modifications can be made to the disclosed embodiments without substantially departing from the principles of the disclosure. Therefore, the disclosed embodiments are used in a generic and descriptive sense only and not for purposes of limitation.

What is claimed is:

1. A display device comprising:
a table including an upper plate portion and a support portion that supports the upper plate portion;
a window member disposed in an upper portion of the upper plate portion; and
a display module slidable with respect to the window member,
wherein a position of the display module varies from a first position of being accommodated in the upper plate portion to overlap the window member to a second position of protruding from the upper portion of the upper plate portion.

2. The display device of claim 1, wherein the display module is flatly unfolded parallel to the window member in the first position.

3. The display device of claim 1, wherein the display module is visible through the window member in the first position.

4. The display device of claim 1, wherein the display module is perpendicular or inclined with respect to the window member in the second position.

5. The display device of claim 1, wherein an overlapping area between the window member and the display module in the first position is greater than an overlapping area between the window member and the display module in the second position.

6. The display device of claim 1, wherein the display module forms an inclination with the window member and protrudes out of the upper plate portion of the table when the display module slides.

7. The display device of claim 6, wherein
a portion of the display module that overlaps the window member slides parallel to the window member, and
a portion of the display module that does not overlap the window member slides in a direction crossing the window member.

8. The display device of claim 6, wherein
at least a portion of the display module accommodated in the upper plate portion slides parallel to the window member, and
at least a portion of the display module that protrudes from the upper portion of the upper plate portion slides in a direction crossing the window member.

9. The display device of claim 6, further comprising a roller extending in a direction crossing a sliding direction of the display module,
wherein the display module is bent such that the sliding direction of the display module varies based on the roller.

10. The display device of claim 1, further comprising a driver electrically connected to a side of the display module, the driver elevating the side of the display module.

11. The display device of claim 1, further comprising:
a rail disposed in the upper plate portion; and
a guide member which connects the rail to the display module and slides along the rail to guide sliding of the display module.

12. The display device of claim 11, wherein
the display module includes a display panel and a support member that supports the display panel, and
the guide member is directly connected to the support member.

13. The display device of claim 12, wherein the guide member and the support member are integral with each other.

14. The display device of claim 12, wherein the support member is a metal plate.

15. The display device of claim 1, wherein
the window member includes:
a glass window; and
a touch sensing layer disposed on a lower surface of the glass window, and
the display module includes a display panel and a film window disposed on an upper surface of the display panel.

16. The display device of claim 15, wherein the glass window is thicker than the film window.

17. A display device comprising:
a window member including a touch sensing layer;
a display module slidable with respect to the window member;
a driver electrically connected to a side of the display module, the driver elevating the side of the display module in a direction crossing the window member;
a guide member connected to another side of the display module; and
a rail connected to the guide member,
wherein a position of the display module varies from a first position of overlapping the window member to a second position of being perpendicular or inclined with respect to the window member.

18. The display device of claim 17, wherein the display module is flatly unfolded parallel to the window member in the first position.

19. The display device of claim 17, wherein the display module forms an inclination with the window member when the display module slides.

20. The display device of claim 17, wherein the window member, the display module, the driver, the guide member, and the rail are disposed in a table.

* * * * *